(12) United States Patent
Niedzballa

(10) Patent No.: US 10,029,785 B2
(45) Date of Patent: Jul. 24, 2018

(54) AIRCRAFT CAPABLE OF VERTICAL TAKEOFF

(71) Applicant: Airbus Defence and Space GmbH, Taufkirchen (DE)

(72) Inventor: Hans Niedzballa, Rosenheim (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 284 days.

(21) Appl. No.: 15/019,717

(22) Filed: Feb. 9, 2016

(65) Prior Publication Data

US 2016/0236774 A1 Aug. 18, 2016

(30) Foreign Application Priority Data

Feb. 13, 2015 (DE) .................. 10 2015 001 704

(51) Int. Cl.
*B64C 27/22* (2006.01)
*B64C 29/00* (2006.01)
(Continued)

(52) U.S. Cl.
CPC .......... *B64C 29/0025* (2013.01); *B64C 27/30* (2013.01); *B64D 27/02* (2013.01);
(Continued)

(58) Field of Classification Search
CPC ..... B64C 29/0025; B64C 39/12; B64C 29/00; B64C 2201/021; B64C 2201/042;
(Continued)

(56) References Cited

U.S. PATENT DOCUMENTS 1,652,554 A * 12/1927 Bolgiano .............. B64C 23/005
244/100 R
2,925,130 A * 2/1960 Buivid .................... B64C 27/50
416/143
(Continued)

FOREIGN PATENT DOCUMENTS

DE 19745492 4/1999
DE 10241732 3/2004
(Continued)

OTHER PUBLICATIONS

German Office Action, dated Dec. 8, 2015, priority document.
European Search Report, dated Jun. 30, 2016, priority document.

*Primary Examiner* — Medhat Badawi
(74) *Attorney, Agent, or Firm* — Greer, Burns & Crain, Ltd.

(57) ABSTRACT

An aircraft has a bearing structure, the bearing structure having at least one central fuselage and two pylons each situated at a distance laterally from the fuselage. In addition, the aircraft has a wing structure, at least four hub rotors, and at least one thrust drive. Each hub rotor is fastened to the bearing structure, has a propeller having two propeller blades, and produces, through rotation of the propeller, an upward drive force acting in the vertical direction on the aircraft. The thrust drive is produces a thrust force acting in the horizontal direction on the bearing structure. The pylons each have two hub rotors, the hub rotors being configured to arrest respective propeller blades of a hub rotor in a position relative to the pylons. In the arrested position, the propeller blades of a hub rotor do not extend beyond the outer dimensions of the pylons.

15 Claims, 4 Drawing Sheets

(51) Int. Cl.
    *B64C 27/30*      (2006.01)
    *B64D 27/02*      (2006.01)
    *B64D 27/24*      (2006.01)

(52) U.S. Cl.
    CPC ........ *B64D 27/24* (2013.01); *B64C 2201/108* (2013.01); *B64C 2201/165* (2013.01); *B64D 2027/026* (2013.01)

(58) Field of Classification Search
    CPC .......... B64C 2201/06; B64C 2201/104; B64C 2201/108; B64C 2211/00; B64C 29/0033; B64C 39/024; B64C 27/00; B64C 2201/165; B64C 27/30; B64D 27/24; B64D 27/02; Y02T 50/12; Y02T 50/44; Y02T 50/62; Y02T 50/64
    See application file for complete search history.

(56) References Cited

U.S. PATENT DOCUMENTS

| | | | | |
|---|---|---|---|---|
| 3,061,242 A * | 10/1962 | Zurawinski | ......... | B64C 29/0033 244/23 A |
| 3,096,041 A * | 7/1963 | Cheeseman | ............ | B64C 27/26 244/7 R |
| 3,097,701 A * | 7/1963 | Buivid | ............. | B64C 27/50 416/143 |
| 3,260,476 A * | 7/1966 | James | ............. | B64C 29/0025 244/55 |
| 3,490,720 A * | 1/1970 | Girard | ............. | B64C 3/40 244/46 |
| 3,528,630 A * | 9/1970 | Ferris | ............. | B64C 27/50 244/12.3 |
| 3,627,234 A * | 12/1971 | Dziallas | ............. | B64C 23/08 244/7 A |
| 3,693,910 A * | 9/1972 | Aldi | ............. | B64C 27/30 244/7 A |
| 3,997,131 A * | 12/1976 | Kling | ............. | B64C 27/10 244/17.19 |
| 4,554,989 A * | 11/1985 | Gruich | ............. | B60K 3/04 180/6.5 |
| 4,709,882 A * | 12/1987 | Galbraith | ............. | B64C 27/12 244/53 R |
| 4,726,545 A * | 2/1988 | Kress | ............. | B64C 29/005 244/12.3 |
| 4,789,115 A * | 12/1988 | Koutsoupidis | ............. | B64C 27/26 244/215 |
| 4,955,560 A * | 9/1990 | Nishina | ............. | B64D 27/24 244/53 R |
| 4,979,698 A * | 12/1990 | Lederman | ............. | B64C 29/0033 244/17.13 |
| 5,971,320 A * | 10/1999 | Jermyn | ............. | B64C 27/16 244/17.23 |
| 6,293,491 B1 | 9/2001 | Wobben | | |
| 6,431,297 B1 * | 8/2002 | Nakazawa | ............. | B60L 9/22 180/65.1 |
| 7,150,429 B2 * | 12/2006 | Kusic | ............. | B64C 27/08 244/17.23 |
| 7,204,442 B2 * | 4/2007 | Roozeboom | ............. | B02C 13/06 241/191 |
| 7,226,017 B2 * | 6/2007 | Blevio, Sr. | ............. | B64C 25/32 244/1 R |
| 7,699,260 B2 * | 4/2010 | Hughey | ............. | B64C 27/08 244/17.11 |
| 8,286,737 B2 * | 10/2012 | Blevio, Sr. | ............. | B64C 25/32 180/20 |
| 9,096,314 B2 * | 8/2015 | Brotherton-Ratcliffe | ............. | B64C 27/20 |
| 9,115,774 B2 * | 8/2015 | Long | ............. | F16D 43/18 |
| 9,169,027 B2 * | 10/2015 | Strauss | ............. | B64D 35/00 |
| 9,187,174 B2 * | 11/2015 | Shaw | ............. | B64C 29/0033 |
| 9,242,714 B2 * | 1/2016 | Wang | ............. | B64C 39/028 |
| 9,481,457 B2 * | 11/2016 | Alber | ............. | B64C 39/024 |
| 9,702,254 B2 * | 7/2017 | Saiz | ............. | B64C 27/26 |
| 2003/0094537 A1 * | 5/2003 | Austen-Brown | ....... | B64C 27/28 244/7 R |
| 2007/0187547 A1 * | 8/2007 | Kelly | ............. | B64B 1/20 244/7 R |
| 2008/0099604 A1 * | 5/2008 | Goodrich | ............. | B64F 1/02 244/110 C |
| 2012/0267473 A1 * | 10/2012 | Tao | ............. | B64C 3/44 244/38 |
| 2013/0020429 A1 * | 1/2013 | Kroo | ............. | B64C 3/16 244/6 |
| 2013/0062455 A1 * | 3/2013 | Lugg | ............. | B64C 29/0025 244/12.3 |
| 2013/0062457 A1 * | 3/2013 | Deakin | ............. | B64B 1/08 244/25 |
| 2013/0264429 A1 * | 10/2013 | Miodushevsky | ... | B64C 29/0033 244/7 A |
| 2015/0021442 A1 * | 1/2015 | Hunter | ............. | B64D 27/24 244/53 R |
| 2015/0136897 A1 * | 5/2015 | Seibel | ............. | B64C 29/0033 244/6 |
| 2015/0144742 A1 * | 5/2015 | Moxon | ............. | B64D 27/12 244/215 |
| 2015/0239559 A1 * | 8/2015 | Uskert | ............. | B64D 7/08 244/137.4 |
| 2016/0031554 A1 * | 2/2016 | Eshkenazy | ............. | B64C 39/024 244/6 |
| 2016/0052626 A1 * | 2/2016 | Vander Mey | ............. | B64C 27/02 244/6 |
| 2016/0207625 A1 * | 7/2016 | Judas | ............. | B64C 29/0025 |
| 2016/0221671 A1 * | 8/2016 | Fisher | ............. | B64C 27/08 |
| 2016/0297520 A1 * | 10/2016 | Sada-Salinas | ...... | B64C 29/0025 |
| 2016/0318600 A1 * | 11/2016 | Wirasnik | ............. | B64C 11/28 |
| 2017/0183081 A1 * | 6/2017 | Du | ............. | B64C 1/30 |

FOREIGN PATENT DOCUMENTS

| | | |
|---|---|---|
| DE | 102012104783 | 12/2013 |
| FR | 966032 | 9/1950 |
| KR | 1020120060590 | 12/2013 |
| WO | 2006113877 | 10/2006 |

* cited by examiner

AIRCRAFT CAPABLE OF VERTICAL TAKEOFF

CROSS-REFERENCES TO RELATED APPLICATIONS

This application claims the benefit of the German patent application No. 10 2015 001 704.7 filed on Feb. 13, 2015, the entire disclosures of which are incorporated herein by way of reference.

BACKGROUND OF THE INVENTION

The present invention relates to an aircraft capable of vertical takeoff, similar for example to a quadcopter.

For many applications, it is desirable to have available an aircraft that can take off from a minimally small surface and thus, for example, does not require any special large-area airport. In addition, for some purposes an aircraft is required that is agile and that can be maneuvered precisely, and that preferably can hover in place with good hovering characteristics.

For example, for air monitoring and reconnaissance aircraft are used that are intended to hover over a target of interest, while, for example, being capable of recording images from the air. In an alternative application, an aircraft capable of vertical takeoff, sometimes also referred to as VTOL (Vertical Take-Off and Landing), can be used to fly to areas that are difficult for human beings or other machines to access, for example, in the context of catastrophe response interventions to enable transport of goods such as tools, food, or medications to such areas.

For such uses, inter alia, aircraft have been developed in which four or more rotors, equipped with a propeller and a motor that drives the propeller, each provide an essentially upward-directed vertical thrust in order, in this way, to cause the aircraft to lift off vertically or to hover. Such an aircraft equipped with four such rotors is also referred to as a quadcopter, quadrocopter, quadricopter, quadrotor, or flying platform. In general, such aircraft having more than three drive rotors are designated multicopters, standard variants including, in addition to quadcopters, those having three rotors (tricopter), six rotors (hexacopter), or eight rotors (octocopter). Such aircraft are usually operated in unmanned fashion and can be correspondingly small. In some cases, these aircraft are also referred to as drones.

Through slight tilting of the overall aircraft, or of one or more rotors, away from the horizontal, such aircraft can also be provided with a degree of forward drive, in that a thrust produced by the rotors is inclined away from the vertical. However, the flight speeds that can be achieved in this way are limited to relatively low speeds, typically below 200 km/h, frequently even less than 100 km/h, due to the physical boundary conditions that occur in this type of aircraft. Such a speed limitation results, for example, from the physical boundary condition that the propeller used for the drive is operated at high rotational speeds, and therefore a propeller blade moving forward in the direction of flight of the aircraft would, already at relatively low flight speeds, have to be moved almost at the speed of sound at least at its propeller blade tips, thus generating high air resistance and loud noises.

Therefore, conventional multicopters have good hovering properties—similar to helicopters, in which only a single rotor provides the necessary drive and a complicated rotor mechanism can be used together with a rear rotor for maneuvering the helicopter—but standardly achieve only relatively low travel flight speeds.

KR 10 2012 006 05 90 A describes a quadrocopter that can take off and land vertically and in which a direction of thrust of propellers can be varied in order, in this way, to enable provision not only of an upward drive, but also a forward drive for the quadrocopter.

SUMMARY OF THE INVENTION

Based on this background, an object of the present invention is to provide an aircraft that enables both good hovering characteristics and also high travel flight speeds.

According to the present invention, an aircraft is disclosed that has a bearing structure, the bearing structure having at least one central fuselage and two pylons, each situated at a distance laterally from the fuselage. In addition, the aircraft has a wing structure, at least four hub rotors, and at least one thrust drive. Each of the hub rotors is fastened to the bearing structure, has a propeller having two propeller blades, and is fashioned or configured to produce an upward drive force, acting in the vertical direction, for the aircraft through the rotation of the propeller. The thrust drive is fashioned or configured to produce a thrust force acting in the horizontal direction on the bearing structure. The pylons each have at least two hub rotors, the hub rotors being fashioned or configured to arrest respective propeller blades of a hub rotor in a position relative to the pylons. In the arrested position, the propeller blades of a hub rotor do not extend past the outer dimensions of the pylons.

The present invention is based on the idea of providing an aircraft that has hub rotors that produce a vertical thrust with the aid of which the aircraft can take off and land vertically and can hover, and in addition, on the other hand, to provide a thrust drive that can produce a thrust acting in the horizontal direction, so that, independently of the hub rotors, the aircraft can be accelerated to a high travel flight speed after the rotors have been shut off. In order to achieve an aerodynamically optimal shape, when the hub rotors are shut off, the propeller blades of the hub rotors are housed in the structure of the aircraft, for example in pylons, in such a way that they have the least possible air resistance during traveling flight.

The propeller of the hub rotor of the aircraft has exactly two propeller blades. Such a propeller has, on the one hand, a high degree of efficiency and, on the other hand, low imbalance. In addition, such a propeller having two propeller blades for the disclosed aircraft is particularly advantageous because, during a flight travel position, it can be arrested in a rotational position in such a way that the propeller extends parallel to the direction of flight. In such a rotational position, the arrested propeller produces minimal air resistance.

The hub rotors of the aircraft are fashioned to arrest respective propeller blades of a hub rotor in a particular rotational position. Such an arresting of the propeller blades can, in particular, be advantageous if the aircraft moves horizontally with a high travel flight speed, driven by the thrust drive, and the airfoils of the wing structure produce a sufficiently dynamic upward drive, so that no additional upward drive has to be produced by the hub rotors. In such a flight situation, it is advantageous to arrest the propeller blades of the hub rotors in a rotational position in such a way that, on the one hand, during traveling flight they produce as little air resistance as possible, and, on the other hand, forces acting horizontally and/or vertically on the propeller blades are produced, by the air flowing past them, that are as low as possible.

In order to further reduce the air resistance of the rotor blades during traveling flight, the hub rotors are situated in the bearing structure of the aircraft, here in the pylons, in such a way that in the arrested position the rotor blades of the hub rotors do not extend past the outer dimensions of the pylons. Thus, in the arrested position the pylons form, with the propeller blades, an aerodynamically optimized shape.

Preferably, the propellers are situated in the pylons in such a way that they are surrounded by the pylon at least at two oppositely situated sides. The pylons are preferably fashioned such that the propeller blades can be accommodated in the width of the pylons. Here, in the arrested position, in which the propeller blades are oriented in the longitudinal direction of the pylons, the propeller blades preferably do not protrude beyond the pylons.

Preferably, the pylons have openings, open at both sides, transverse to the direction of extension of the pylons, in which openings the propellers of the hub rotors are integrated. Preferably, the openings form a continuous opening through the pylon transverse to the direction of extension of the pylons. In other words, in the region of the hub rotors, transverse to the longitudinal direction of the pylons, the pylons have openings that pass through the entire width of the pylons. These openings can also be referred to as slots. It is sufficient if the openings or slots are dimensioned such that the rotor blades can rotate freely. The axis of rotation of the propellers is here situated as close as possible along the longitudinal axis of the pylons. In the non-arrested position, in this way the hub rotors can produce the necessary vertical thrust. For traveling flight, the propellers of the hub rotors can be arrested, and, due to the situation of the hub rotors in the pylons of the aircraft, are aerodynamically optimally situated when arrested in the longitudinal direction of the pylons. The propellers of the hub rotors thus produce as little air resistance as possible during traveling flight.

Preferably, for each of the propellers of the hub rotors, an opening is present in the pylons. In order to achieve a maximally aerodynamically optimal surface of the pylons, the pylons preferably have openings or slots for the propellers only in the area of the hub rotors. Alternatively, the opening in the longitudinal direction of the pylons can be made larger, and one or a plurality of hub rotors can be configured in series or one over the other inside the opening. Here, for static reasons the opening can have, in some sections, stabilizing struts or areas between the individual hub rotors.

Preferably, the pylons have at least one sealing device that laterally seals the openings when the propeller blades are arrested. In order to further reduce the air resistance of the propellers in the pylons, the openings of the pylons can be sealed, so that the pylons have an aerodynamically optimal, nearly smooth surface. In order to seal the openings in the area of the hub rotors when the propeller blades are in the arrested position, the pylons are provided with a sealing device that can seal the openings.

Preferably, the sealing device is made up of one segment or a plurality of segments. The sealing device for sealing the openings in the pylons can, for each of the openings, be made up of one segment or a plurality of segments. Here, the sealing device can have almost any shape suitable for sealing the openings in the pylons in as aerodynamically optimal a fashion as possible. Preferably, the sealing device is adapted in its shape to the contour of the pylons in the area of the openings for the propellers of the hub rotors. The sealing device can seal the openings from the side, from below, from above, from the outside, or from the inside of the pylons. In the case of a multipart sealing device, the sealing device can be realized symmetrically or asymmetrically. The sealing device can be realized in the form of a sealing flap having one segment or a plurality of segments, in the form of a rolling shutter or blind made up of one segment or a plurality of segments, or any other suitable shape.

Preferably, the wing structure is fastened on the bearing structure and the wing structure is fashioned to produce an upward drive force for the aircraft when there is a horizontal movement of the aircraft. For this purpose, the wing structure has at least one airfoil that is provided with a profile that produces a dynamic upward drive.

The airfoil or airfoils of the wing structure are preferably dimensioned such that, at the travel flight speeds that are to be achieved by the aircraft, they can by themselves provide an adequate upward drive for the aircraft, so that at travel flight speed an upward drive produced by the hub rotors can be done without.

An aircraft according to the present invention that is provided with a combination of at least four hub rotors and at least one thrust drive, as well as a suitably fashioned wing structure, can have the desired good hovering characteristics while also being capable of achieving high travel flight speeds. Here, for example, during takeoff or landing or while hovering, i.e., when there is no or only slight horizontal speed of the aircraft, the hub rotors can provide a required upward drive. Independently of the hub rotors, the thrust drive can accelerate the aircraft in the horizontal direction, and, at sufficiently high horizontal speeds, a dynamic upward drive brought about by the at least one airfoil of the wing structure can be sufficiently high to bear the aircraft.

The individual components of the proposed aircraft can be fashioned and controlled relatively simply.

Preferably, the pylons are connected to the central fuselage via the at least one wing structure. In an advantageous specific embodiment, the bearing structure together with the wing structure is fashioned as a so-called trimaran-like bearing structure having a central fuselage. In such a trimaran-like bearing structure, at least one oblong central fuselage is provided, to which a respective side fuselage, a so-called pylon, is laterally situated; i.e., at least one central fuselage is flanked at both sides by at least one respective pylon. The pylons are connected to the central fuselage via the wing structure and/or via at least one part of the bearing structure. In addition, or alternatively, the pylons can be connected to the central fuselage via further elements of the bearing structure. These further elements can also additionally provide upward drive. Here, the central fuselage can also be made up of a plurality of centrally situated fuselages connected to one another, situated laterally alongside one another.

Preferably, the pylons are situated at least far enough from the central fuselage of the aircraft that the propellers of the hub rotors have adequate space. The distance between the pylons and the fuselage is thus at least the length of a propeller blade.

The pylons can for example each have two of the hub rotors. For example, a respective motor for the rotor can be accommodated in the pylon. The pylon can be fashioned so as to promote flow in relation to an airflow produced by the rotor and/or in relation to an airflow during traveling flight. According to a further specific embodiment, two propellers situated one over the other can also be used per hub rotor. Preferably, the propellers here have opposite directions of rotation. The individual propellers can be situated together in a common slot or separately in a respective separate slot. Preferably, the axis of rotation of the two propellers is situated on the same axis of symmetry; i.e., the propellers are situated directly one over the other and overlap one another. For static reasons, propellers can have only a certain maximum diameter. In order to make it possible to increase the power of the hub rotors, the just-described double propellers can be used. Due to the counter-rotating configuration of the propellers, the air turbulence produced by the first propeller has a positive influence on the upward drive of the second propeller, and in this way brings about an increase in power of the double propeller in comparison with the single propeller. The vertical spacing of the two propellers from one another is here at most 15% of the diameter of the propellers. The increase in power, for example in the case of a single propeller having 80% efficiency, is an increase to a degree of efficiency of approximately 85% for the double propeller.

In particular, a steering mechanism or rudder can be situated on the airfoil. With the aid of such a steering mechanism or rudder, the upward drive produced by the trimaran-like bearing structure can be suitably influenced, e.g., during acceleration to travel flight speed, and, along with this, during successive throttling of the hub rotors.

The proposed aircraft is to have a bearing structure and a wing structure. Here, the bearing structure is intended to provide structural strength of the aircraft so that both the wing structure and the hub rotors can be fastened stably to the aircraft. The wing structure is intended to provide a dynamic upward drive with the aid of suitably fashioned airfoils when the aircraft assumes a sufficiently high travel flight speed.

It is to be noted that the fact that two separate terms are used for the bearing structure and the wing structure does not mean that the functions to be performed by the bearing structure and the wing structure necessarily have to be performed by separate real structures. For example, functions of the bearing structure and functions of the wing structure can be performed by different structural components of the proposed aircraft, or also by the same structural components of the aircraft. As an example, a wing of an aircraft can simultaneously act as an airfoil bringing about a dynamic upward drive, and thus as part of a wing structure, and can also connect other components of the aircraft to one another mechanically, thus acting as part of a bearing structure. For example, the wing can have an outer skin that determines a profile of an airfoil formed thereby, and is thus part of the wing structure. At the same time, the wing can have interior components, such as struts, that provide mechanical strength and to which for example the wing skin is fastened, so that these can act as a bearing structure.

Preferably, the hub rotors are fashioned in such a way that a plane of rotation in which propeller blades of the hub rotor rotate is stationary in relation to a rotor axle of the hub rotor driven by a motor. In other words, the hub rotors of the aircraft can have a simple mechanical construction, and, for example, a simple propeller can be coupled directly to an axle driven by a motor. It is in particular not necessary to connect rotor blades of the hub rotor to a motor-driven rotor axle using a complicated mechanism, such as a swashplate, as in a helicopter. In particular, it is not necessary to modify a setting angle or angle of inclination of individual rotor blades during a rotor rotation in order also in this way to provide a forward drive of the aircraft, or a rolling, pitching, or yawing of the aircraft. Instead, in the proposed aircraft a forward drive can be brought about using the additional thrust drive. A rolling, pitching, or yawing of the aircraft can be brought about by varying the drive forces produced by each of the (in general at least four) hub rotors.

Preferably, propeller blades of the hub rotor are connected rigidly to the rotor axle. A propeller provided with rigid blades in this way does not have any movable parts. It is therefore robust, and, for example, does not require any mechanism or controller in order to enable controlling of a variable configuration of propeller blades. In particular, the propeller can have a one-piece construction. The upward drive force produced by a hub rotor having such a simple construction is mainly a function of the rotational speed with which the propeller is operated, and can therefore be controlled in a simple manner through suitable controlling of the driving motor.

Preferably, the propeller blades of the thrust drive are connected in pivotable fashion to the rotor axle in such a way that a pitch of the propeller blades can be varied. In other words, an angle that the propeller blades assume in relation to the plane of rotation in which the propeller blades rotate can be varied. Such a varying of the pitch of the propeller blades can preferably be brought about in common for all propeller blades. In particular, a varying of the pitch of the propeller blades can be carried out independent of a current position of the rotating propeller blades; i.e., the propeller blades are not, as in the case of a swashplate in a helicopter, varied in their pitch during a rotation; rather, the pitch of the propeller blades remains largely constant during a rotation. Such a relatively slow varying of the pitch of the propeller blades can be brought about easily and using a robust mechanism.

By varying the pitch of the propeller blades, the thrust of the thrust drive, and thus the forward drive force it produces, can be influenced without necessarily having to modify a rotational speed of the propeller. Such a thrust propeller provided with propeller blades that can be pivoted in common is also referred to as a variable-pitch propeller.

The thrust drive is, for example, fashioned as a puller drive or as a pusher drive. More precisely, the propeller of the thrust drive is fashioned as a puller propeller or as a pusher propeller. In the case of a puller propeller, the propeller pulls the aircraft; i.e., in the direction of flight, the propeller is situated at the front side of the fuselage, of the pylons, of the airfoils, or on the front side of the elevator unit. In the direction of flight, a pusher propeller is situated on the rear side of the aircraft; i.e., for example, on the rear side of the fuselage, of the pylons, of the airfoils, or the like.

Preferably, the hub rotors and the thrust drive are driven by motors that can be controlled independently of one another. In order to cause the aircraft to rotate about its vertical axis, i.e., to yaw, it is advantageous to equip the proposed aircraft with at least four hub rotors, similar to a quadcopter. The four hub rotors can preferably be controlled independently of one another. Because the position or inclination of the aircraft can already be determined by the thrust produced by at least three hub rotors, the provision of an additional, fourth hub rotor creates the possibility of also causing the aircraft to yaw. Thus, through suitable controlling of the four hub rotors the aircraft can be brought into any desired position and flight direction. Such an aircraft having four or more hub rotors can, in addition to having good hover characteristics, also be capable of being maneuvered precisely and with agility.

On the basis of such motors that can be controlled separately from one another, in the aircraft an upward drive produced by the hub rotors, on the one hand, and a forward drive produced by the thrust drive, on the other hand, can be controlled independently of one another. In particular, a rolling or yawing of the aircraft to be brought about by the hub rotors can be controlled independently of the horizontal forward drive to be brought about by the thrust drive. Here, as the travel flight speed increases, the hub rotors can also be correspondingly controlled to produce less upward drive, in order to make it possible to take into account the dynamic upward drive then brought about by the airfoil of the wing structure.

Preferably, each of the hub rotors is driven by an electric motor. Electric motors can be controlled precisely and quickly with regard to their rotational speed, so that the upward drive produced by a hub rotor can be varied rapidly and precisely in order to introduce or to control particular flight movements of the aircraft. In particular, in the case of an aircraft similar to a multicopter, the precise and rapid controlling of the vertical thrust forces produced by the individual hub rotors can be important for safe, stable, and, if required, agilely maneuverable flight characteristics.

Preferably, the thrust drive is driven by an internal combustion engine and the internal combustion engine is coupled to a generator in order to provide electrical energy to the electric motors of the hub rotors.

In such an aircraft, provided with a kind of hybrid drive, the thrust force acting in the horizontal direction can be brought about by the internal combustion engine of the thrust drive. Here, the internal combustion engine can be realized in the form of a piston engine or a jet engine or the like. Propellant for such an internal combustion engine can be carried in the aircraft in sufficient quantities so that the thrust drive can be operated over long periods of time and the aircraft can thus fly for a longer time at a travel flight speed in order, for example, to reach a distant destination. In contrast to the thrust drive, however, the hub rotors are preferably driven by electric motors in order to make it possible to take advantage of their simpler and more precise controllability compared to an internal combustion engine during hovering flight or during takeoff or landing. The electrical energy for these electric motors can be provided by the generator coupled to the internal combustion engine, and the electrical energy can be supplied either directly from the generator to the electric motors, or can first be stored in an electrical storage unit such as a battery, and then called by the electric motors as needed. The thrust drive can for example be mechanically driven directly or indirectly by the generator.

Alternatively, the thrust drive is also driven by an electric motor, and the electrical energy for operating the electric motors is provided by a battery or by a generator. The battery, or an accumulator, is, for example, chargeable by solar cells on the airfoils and/or on the fuselage. The generator can, for example, be driven by an internal combustion engine and can provide electrical energy for driving the electric motors. Alternatively, any other type of generator can be used that is capable of providing electrical energy for operating the electric motors.

BRIEF DESCRIPTION OF THE DRAWINGS

In the drawings, in general, identical reference characters refer to identical parts in the various views. The drawings are not necessarily to scale; in general, the emphasis is instead on illustrating the principles of the present invention. In the following description, various specific embodiments of the present invention are described with reference to the following drawings.

DETAILED DESCRIPTION OF THE PREFERRED EMBODIMENTS

Figure 1:
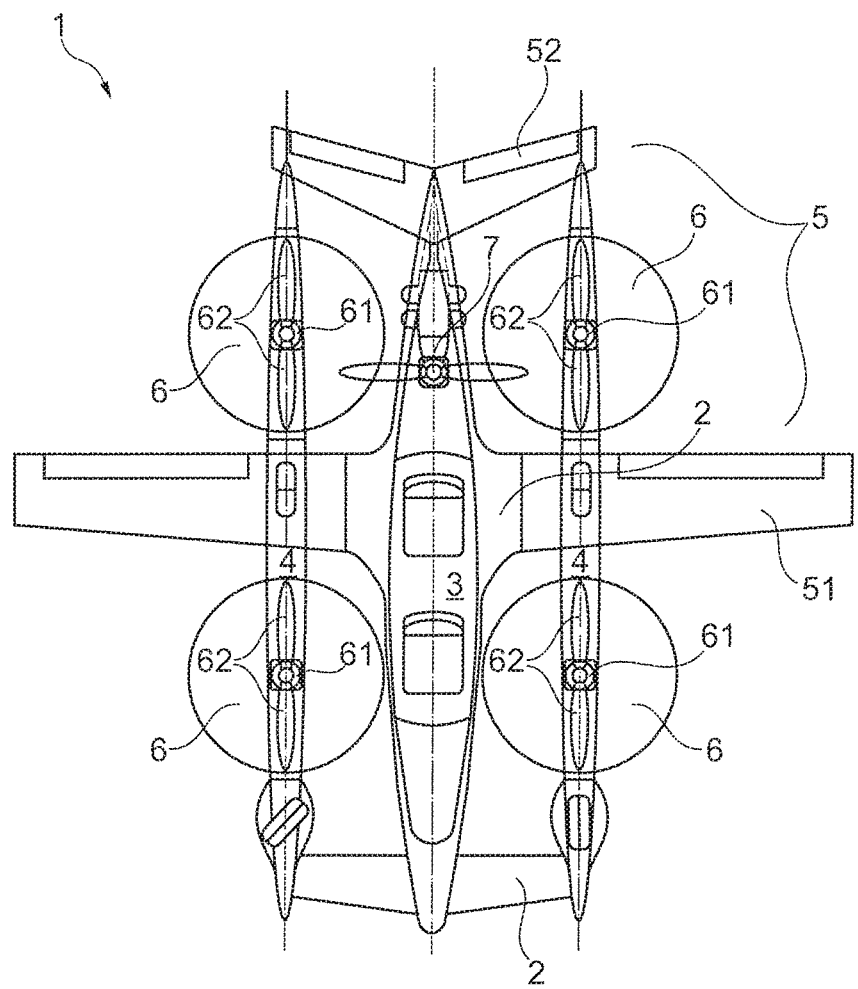
FIG. 1 shows a specific embodiment of the aircraft.

The following detailed description makes reference to the accompanying drawings, which, for illustration, show specific details and specific embodiments in which the present invention can be realized.

Herein, the word "exemplary" is used to mean "serving as an example, case, or illustration." Each specific embodiment or realization described herein as "exemplary" is not necessarily to be interpreted as preferred or advantageous relative to other specific embodiments or realizations.

In the following detailed description, reference is made to the accompanying drawings, which form a part thereof and in which, for illustration, particular specific embodiments are shown in which the present invention can be realized. In this respect, directional terminology, such as "above," "below," "at front," "at rear," "front," "rear," etc., is used with reference to the orientation of the described Figure(s). Because components of exemplary embodiments can be positioned in a number of different orientations, the directional terminology is provided for illustration and is in no way limiting. It will be understood that other specific embodiments can be used, and structural or logical modifications can be made, without departing from the scope of protection of the present invention. It will be understood that the features of the various exemplary specific embodiments described herein can be combined with one another, unless otherwise specifically indicated. The following detailed description is therefore not to be understood in a limiting sense, and the scope of protection of the present invention is defined by the accompanying claims.

In the context of the present description, the terms "connected," and "coupled," are used to describe both a direct and also an indirect connection and a direct or indirect coupling. In the Figures, identical or similar elements have been provided with identical reference characters where useful.

Figure 5:
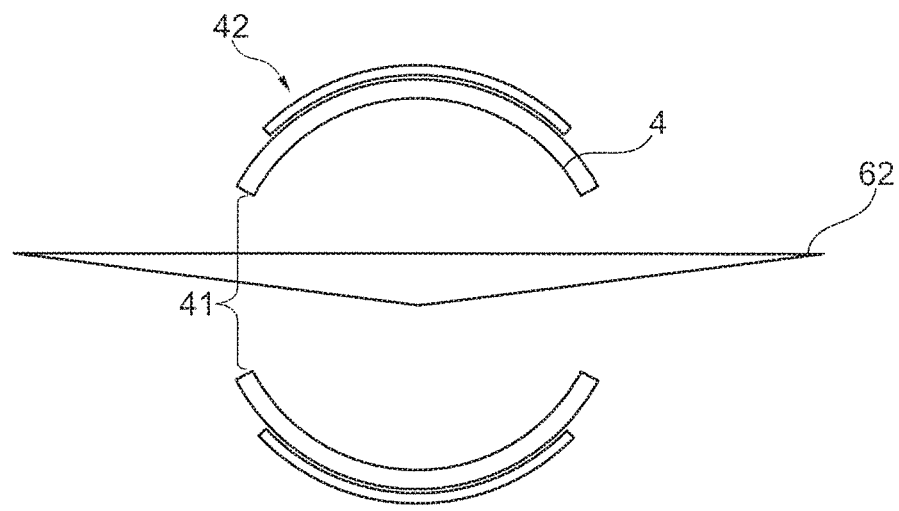
FIG. 5 shows a sectional view of the pylons with propeller in non-arrested position.
Figure 6:
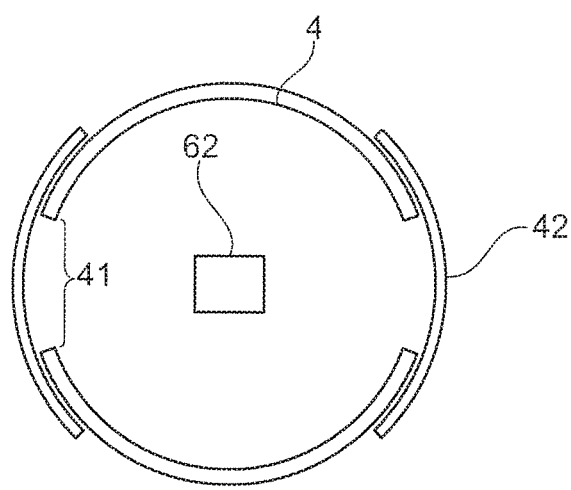
FIG. 6 shows a sectional view of the pylons with propeller in arrested position.

FIG. 1 shows a specific embodiment according to the present invention of an aircraft 1. The aircraft 1 has a bearing structure 2. The bearing structure 2 comprises a central fuselage 3 and two pylons 4 each situated laterally at a distance from the fuselage 3. The aircraft 1 has, in addition, a wing structure 5 that, in the depicted specific embodiment of the aircraft 1, is made up of a main bearing wing 51 and a pitch elevator 52. In the depicted specific embodiment, the aircraft 1 has hub rotors 6 and a thrust drive 7. Each of the hub rotors 6 is fastened to the bearing structure 2 of the aircraft 1. The hub rotors 6 each have a propeller 61 having two propeller blades 62. The hub rotors 6 are fashioned to produce, through rotation of the propeller 61, an upward drive force acting in the vertical direction for the aircraft 1. The thrust drive 7 of the aircraft 1 is fashioned to produce a thrust force acting in the horizontal direction on the bearing structure 2. The pylons 4 of the aircraft 1 each have two hub rotors 6, the hub rotors 6 being fashioned to arrest respective propeller blades 62 of the hub rotor 6 in a position relative to the pylons 4. In the arrested position, the propeller blades 62 of the hub rotors 6 do not extend beyond the outer dimensions of the pylons 4. FIGS. 5 and 6 show the propellers 61 in the arrested and in the non-arrested position in detail.

In the specific embodiment shown in FIG. 1, the rotor blades 62 are shown in the arrested position, or in the position corresponding to the arrested setting. The circle described by the rotating rotor blades 62 is indicated in FIG. 1 as a circle. Here it can be seen that the distance of the pylons 4 from the central fuselage 3 of the aircraft 1 is at least the radius of the circle, i.e., the length of the rotor blade 62.

Figure 2:
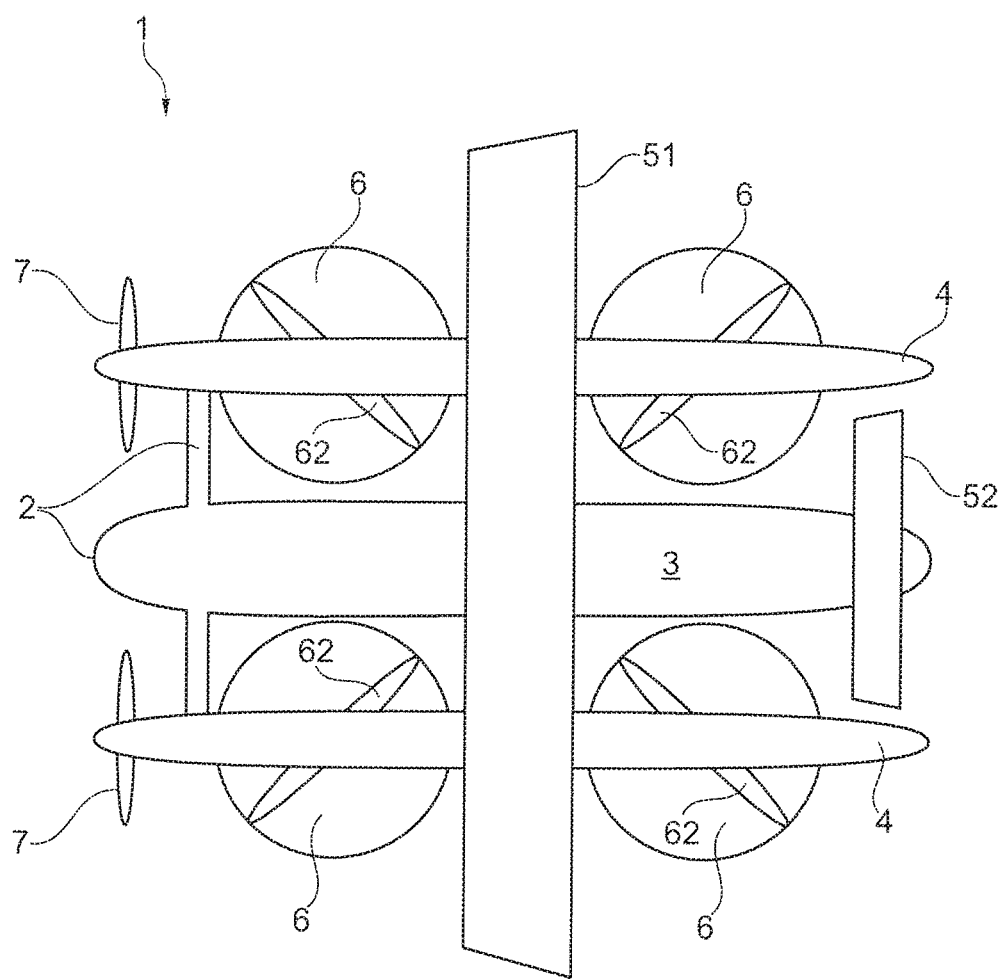
FIG. 2 shows a further specific embodiment of the aircraft.

FIG. 2 shows a further specific embodiment of the aircraft 1. The aircraft 1 shown in FIG. 2 differs from the aircraft 1 shown in FIG. 1 in that, inter alia, the aircraft 1 in FIG. 2 has two thrust drives 7 situated on the front side of the pylons 4. In other respects, the design of the aircraft 1 in FIG. 2 largely corresponds to that of the aircraft 1 of FIG. 1. The aircraft 1 has a bearing structure 2 that has a central fuselage 3 and two pylons 4 each situated laterally at a distance from the fuselage 3. In addition, the aircraft 1 has a wing structure 5 that, in the depicted specific embodiment of the aircraft 1, is made up of a main bearing wing 51 and a pitch elevator 52. In the depicted specific embodiment, the aircraft 1 has four hub rotors 6 and two thrust drives 7. Each of the hub rotors 6 is fastened to the bearing structure 2 of the aircraft 1. The hub rotors 6 each have a propeller 61 having two propeller blades 62. The pylons 4 of the aircraft 1 each have two hub rotors 6.

Figure 3:
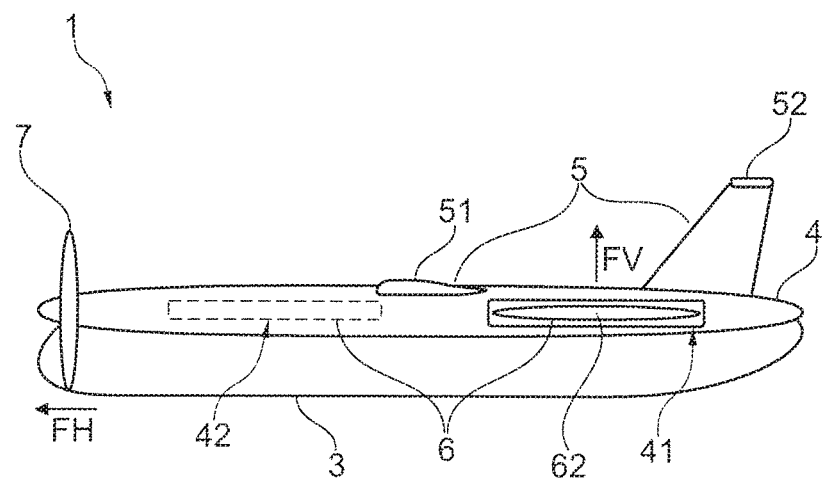
FIG. 3 shows a side view of the aircraft in the specific embodiment of FIG. 2.

FIG. 3 shows a side view of the aircraft of the specific embodiment of FIG. 2. In the aircraft 1 shown in FIG. 3, the two hub rotors 6 are shown in the arrested position. In the hub rotor 6 that is at the front in the direction of flight, an opening 41 in the pylons 4 is sealed by a sealing device 42, for example a sealing flap. The opening 41 of the rear hub rotor 6 in the direction of flight is open. In the arrested position, the propeller blades 62 of the hub rotors 6 are situated inside the pylons 4 and do not extend beyond the dimensions of the pylons 4. The air resistance of the propeller blades 62 is reduced by a configuration of the propeller blades 62 inside the pylons 4 in the arrested position. The air resistance can be further reduced by a sealing device 42, in that the sealing device 42 outwardly terminates the pylons 4 in an aerodynamically optimal fashion. Due to the sealing device 42, when the hub rotors 6 are arrested, the pylons 4 have an aerodynamically optimal shape. The sealing device 42 can have a one-part construction or a multipart construction. When the opening 41 is open, the sealing device 42 can be situated entirely or partly inside the pylons 4, or entirely or partly outside the pylons 4. A specific embodiment of the sealing device 42 is shown in detail in FIGS. 5 and 6.

Figure 4:
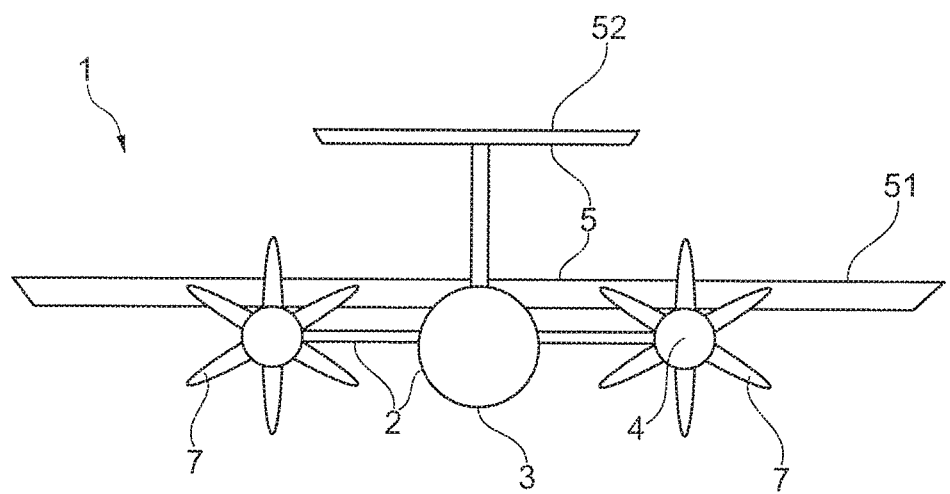
FIG. 4 shows a front view of the aircraft in the specific embodiment of FIG. 2.

FIG. 4 shows a front view of the specific embodiment of the aircraft 1 of FIG. 2. In the specific embodiment shown in FIG. 4, the propellers of the thrust drive 7 are shown as propellers having six blades. However, the thrust drive 7 can also be equipped with a different kind of propeller as needed.

FIG. 5 shows a sectional representation of the pylons 4 with the propeller in the non-arrested position. The propeller blades 62 of the propeller are in the non-arrested position, i.e., in normal hub operation, in the specific embodiment shown in FIG. 5. In the depicted form, the pylon 4 has an opening 41 at both sides of the pylons 4. The propeller can rotate freely in the opening 41 of the pylons 4. In the depicted specific embodiment, the sealing device 42 for sealing the openings 41 is adapted to the outer contour of the pylons 4, and has, in profile, the shape of curved shells. In the depicted specific embodiment, the sealing device 42 is made up of one-part shell segments. The sealing device 42 can have almost any desired shape, and can be constructed with one part or multiple parts per opening side. In the depicted specific embodiment, the sealing device 42 is situated, in the open state, on the outside of the pylons 4. In an alternative specific embodiment (not shown), the sealing device 42 can however, in the open state, also be situated entirely or partly inside the pylons 4.

FIG. 6 shows a sectional representation of the pylons 4 with the propeller in the arrested position. In the specific embodiment shown in FIG. 6, the propeller blades 62 of the propeller are in the arrested position. In the arrested position, the propeller blades 62 are configured in the longitudinal direction of the pylons 4. In the arrested position, the propeller blades 62 of the propeller do not extend beyond the outer dimensions of the pylons 4. In the arrested position of the propeller blades 62, the openings 41, in which the propeller can rotate in the operational state, are capable of being sealed by the sealing device 42. In the specific embodiment shown in FIG. 6, the segment shells of the sealing device 42 are situated over the openings 41. The sealing device 42 seals the openings 41 outwardly, and forms, together with the outer shape of the pylons 4, an outer shape that is as aerodynamically optimal as possible. In the depicted specific embodiment, the sealing device 42 extends past the openings 41 at the upper and at the lower edge of the opening. Alternatively, the sealing device 42 can also terminate the opening 41 in a flush fashion, and can have no, or only a minimal, overlap with the edges of the opening 41 on the inner side and/or on the outer side of the pylons 4. In the specific embodiment shown in FIGS. 5 and 6, the pylon 4 has, in section, a nearly circular shape. The pylon 4 can have almost any desired shape that is aerodynamically suitable and that can preferably completely accommodate the propeller blades of the hub rotors in the arrested position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS 1 aircraft
2 bearing structure
3 fuselage
4 pylon
41 opening
42 sealing device
5 wing structure
51 main wing
52 pitch elevator 6 hub rotor
61 propeller
62 propeller blades
7 thrust drive
FV upward drive force
FH thrust force

The invention claimed is:

1. An aircraft, comprising:
a bearing structure;
the bearing structure having at least one central fuselage and two pylons, each pylon situated laterally at a distance from the fuselage;
a wing structure;
at least four hub rotors;
at least one thrust drive;
each of the hub rotors fastened to the bearing structure, having a propeller having two propeller blades, and configured to produce, through rotation of the propeller, an upward drive force acting in a vertical direction for the aircraft;
the thrust drive configured to produce a thrust force acting in a horizontal direction on the bearing structure;
each pylon having at least two hub rotors;
each hub rotor configured to arrest a respective propeller blade of a respective hub rotor in an arrested position relative to a respective pylon; and
the respective propeller blade of each hub rotor not extending, in the arrested position, beyond an outer dimension of the respective pylon,
wherein each propeller is situated in the respective pylon in such a way that each propeller is enclosed by the respective pylon on at least two opposite sides when in a non-arrested position.

2. The aircraft as recited in claim 1, wherein each pylon has a plurality of openings that are open at opposing sides of each pylon transverse to a direction of extension of the pylons, the propellers of the hub rotors are integrated in the plurality of openings.

3. The aircraft as recited in claim 2, wherein each opening forms a continuous cavity through the pylon transverse to the direction of extension of the pylons.

4. The aircraft as recited in claim 2, wherein each propeller is located within a respective opening of the plurality of openings.

5. The aircraft as recited in claim 2, wherein the pylons have at least one sealing device that laterally seals the openings when the propeller blades are arrested.

6. The aircraft as recited in claim 5, wherein the sealing device is made up of one segment or a plurality of segments.

7. The aircraft as recited in claim 1, wherein the wing structure is fastened to the bearing structure, and the wing structure is configured to produce, when there is a horizontal movement of the aircraft, an upward drive force for the aircraft, and for this purpose having at least one airfoil that is provided with a profile that produces a dynamic upward drive.

8. The aircraft as recited in claim 1, wherein the pylons are connected to the central fuselage via the at least one wing structure.

9. The aircraft as recited in claim 1, wherein the hub rotors are configured such that a plane of rotation in which propeller blades of a hub rotor rotate is stationary in relation to a rotor axle, driven by a motor, of the hub rotor.

10. The aircraft as recited in claim 9, wherein the propeller blades of the hub rotor are connected rigidly to the rotor axle.

11. The aircraft as recited in claim 1, wherein propeller blades of the thrust drive are pivotably connected to the rotor axle in such a way that a pitch of the propeller blades is variable.

12. The aircraft as recited in claim 1, wherein the hub rotors and the thrust drive are driven by motors that are controllable independently of one another.

13. The aircraft as recited in claim 1, wherein each of the hub rotors is driven by an electric motor.

14. The aircraft as recited in claim 13, wherein the thrust drive is driven by an internal combustion engine and the internal combustion engine is coupled to a generator for providing electrical energy to the electric motors of the hub rotors.

15. The aircraft as recited in claim 13, wherein the thrust drive is driven by an electric motor, and the electrical energy for operating the electric motors is provided by one of a battery or a generator.

* * * * *